(12) United States Patent
Bianco

(10) Patent No.: US 6,622,916 B1
(45) Date of Patent: Sep. 23, 2003

(54) OPTICAL INDICIA SCANNER AND METHOD OF USE

(76) Inventor: James S. Bianco, 217 Brainard Rd., Enfield, CT (US) 06082

( * ) Notice: Subject to any disclaimer, the term of this patent is extended or adjusted under 35 U.S.C. 154(b) by 0 days.

(21) Appl. No.: 10/096,798

(22) Filed: Mar. 13, 2002

Related U.S. Application Data

(63) Continuation-in-part of application No. 09/563,047, filed on May 1, 2000, now abandoned.
(60) Provisional application No. 60/132,156, filed on May 3, 1999.

(51) Int. Cl.[7] ................................................. G06K 7/10
(52) U.S. Cl. ................................... 235/454; 235/462.33
(58) Field of Search ................................. 235/454, 455, 235/462.01, 462.08, 462.2, 462.33, 462.45, 472.01

(56) References Cited

U.S. PATENT DOCUMENTS

| | | | | | |
|---|---|---|---|---|---|
| 4,578,571 | A | * | 3/1986 | Williams | ............... 235/472.01 |
| 4,841,129 | A | * | 6/1989 | Tawara et al. | ......... 235/472.01 |
| 5,144,120 | A | * | 9/1992 | Krichever et al. | ..... 235/472.01 |
| 5,627,366 | A | * | 5/1997 | Katz | .......................... 250/234 |
| 5,627,663 | A | * | 5/1997 | Horan et al. | ................ 235/457 |
| 5,949,057 | A | * | 9/1999 | Feng | ..................... 235/472.01 |
| 6,137,105 | A | * | 10/2000 | Drobot et al. | ......... 235/462.33 |

FOREIGN PATENT DOCUMENTS

| | | | | | |
|---|---|---|---|---|---|
| WO | | 9610727 | * | 4/1996 | ........... G01B/11/22 |

* cited by examiner

*Primary Examiner*—Daniel St. Cyr
(74) *Attorney, Agent, or Firm*—John H. Crozier

(57) ABSTRACT

In a preferred embodiment, an optical indicia scanner, including: a housing; a light source disposed in the housing; a photodetector head disposed in the housing; and an optical indicia engaging, clear front plate disposed on the housing through which clear front plate the indicia is scanned when the optical indicia engaging, clear front plate is parallely disposed against the optical indicia.

12 Claims, 4 Drawing Sheets

OPTICAL INDICIA SCANNER AND METHOD OF USE

CROSS-REFERENCE TO RELATED APPLICATIONS

The present application is a continuation-in-part of U.S. patent application Ser. No. 09/563,047, filed May 1, 2000, titled LOW-COST OPTICAL INDICIA SCANNER, now abandoned. Benefit is claimed of the filing date of U.S. Provisional Patent Application No. 60/132,156, filed May 3, 1999, and titled LOW-COST OPTICAL INDICIA SCANNER.

BACKGROUND OF THE INVENTION

1. Field of the Invention

The present invention relates to optical scanners generally and, more particularly, but not by way of limitation, to a novel, hand-held, optical indicia scanner and method of use, which scanner and method are particularly useful in scanning diffraction grating strips and laser-etched bar codes on silicon wafers in the field.

2. Background Art

Optical indicia scanners are widely used to read a variety of optical indicia and almost everyone is familiar with scanners used to read bar codes on products as they are purchased. Such optical indicia scanners may be fixed and the indicia to be read moved past the scanner or they may be hand-held and directed toward the indicia to be read.

A problem exists with hand-held such scanners when they are used to scan diffraction grating strips or bar codes etched on silicon wafers. In these cases, the reading head of the scanner must be held fairly perpendicular to the indicia being scanned and, particularly in the case of diffraction grating strips, it is necessary that the scanner be held fairly parallel to the major axis of the diffraction grating strip. This does not present a problem with fixed installations, since it is relatively easy to make sure that the reading head of the scanner is generally perpendicular to the indicia being scanned and that the path of the reading head is along the major axis of the scanner indicia. However, when it is desired to, for example, authenticate identifying indicia in the field, it is very difficult to properly align the scanner with the indicia being scanned.

Also, known hand-held optical indicia scanners generally include relatively complicated and expensive mechanisms and, thus, they are relatively expensive to manufacture.

Accordingly, it is a principal object of the present invention to provide an optical indicia scanner that is simple and that can be easily employed to scan diffraction grating strips and laser-etched bar codes on silicon wafers.

It is another object of the invention to provide such an optical indicia scanner and method that automatically place the reading head thereof generally perpendicular to the indicia being scanned.

It is an additional object of the invention to provide such an optical indicia scanner and method that facilitate the alignment of the scanner with the major axis of the indicia being scanned.

It is a further object of the invention to provide such an optical indicia scanner that is economical to manufacture.

Other objects of the present invention, as well as particular features, elements, and advantages thereof, will be elucidated in, or be apparent from, the following description and the accompanying drawing figure.

SUMMARY OF THE INVENTION

The present invention achieves the above objects, among others, by providing, in a preferred embodiment, an optical indicia scanner, comprising: a housing; a light source disposed in said housing; a photodetector head disposed in said housing; and an optical indicia engaging, clear front plate disposed on said housing through which clear front plate said indicia is scanned when said optical indicia engaging, clear front plate is parallely disposed against said optical indicia.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Figure 1:
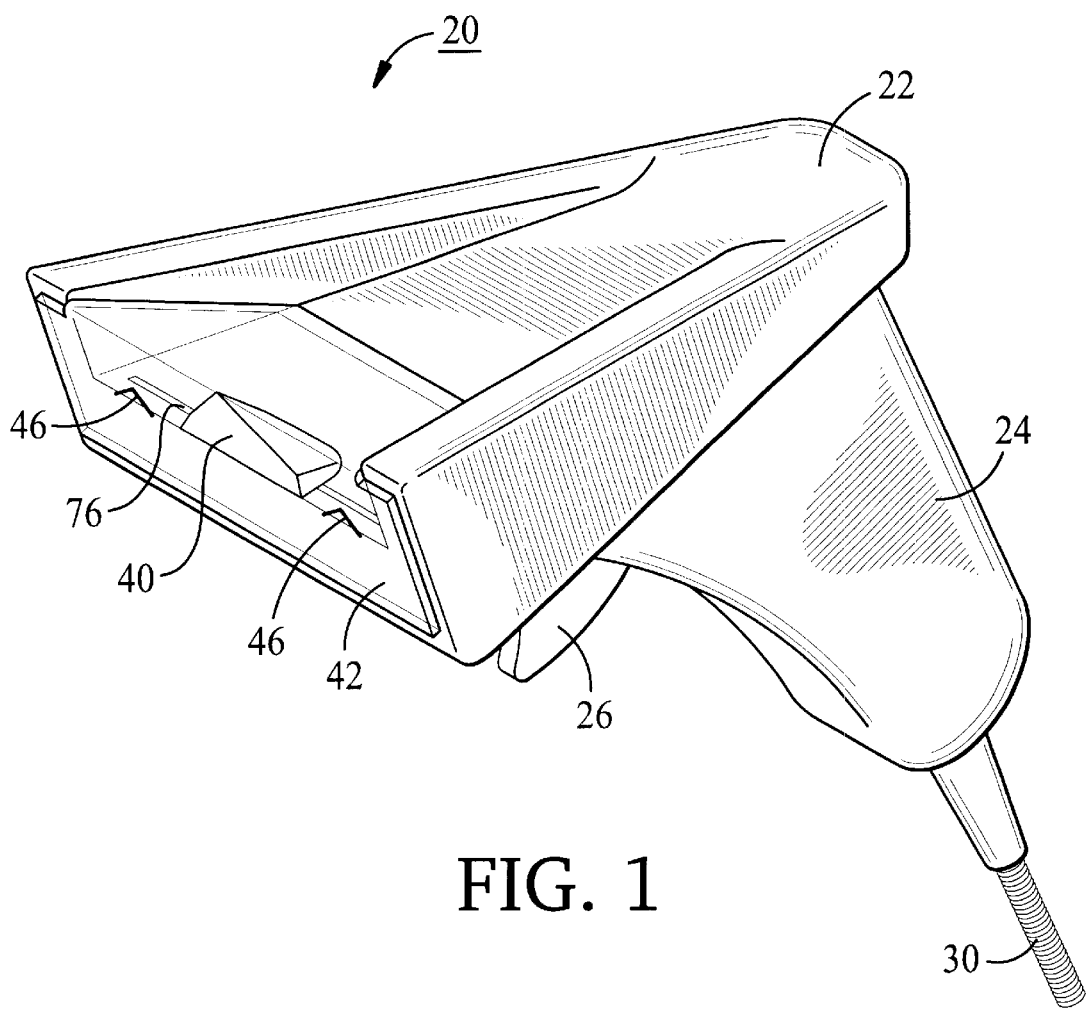
FIG. 1 is an isometric view of an optical indicia scanner constructed according to the present invention.

Reference should now be made to the drawing figures on which similar or identical elements are given consistent identifying numerals throughout the various figures thereof, and on which parenthetical references to figure numbers, when used, direct the reader to the view(s) on which the element(s) being described is (are) best seen, although the element(s) may be seen on other figures also.

The present invention may be employed, for example, with diffraction gratings, holograms (a type of diffraction grating), blaze grating, or pixelgrams, although the operation of the invention is described with reference to diffraction gratings.

Figure 4:
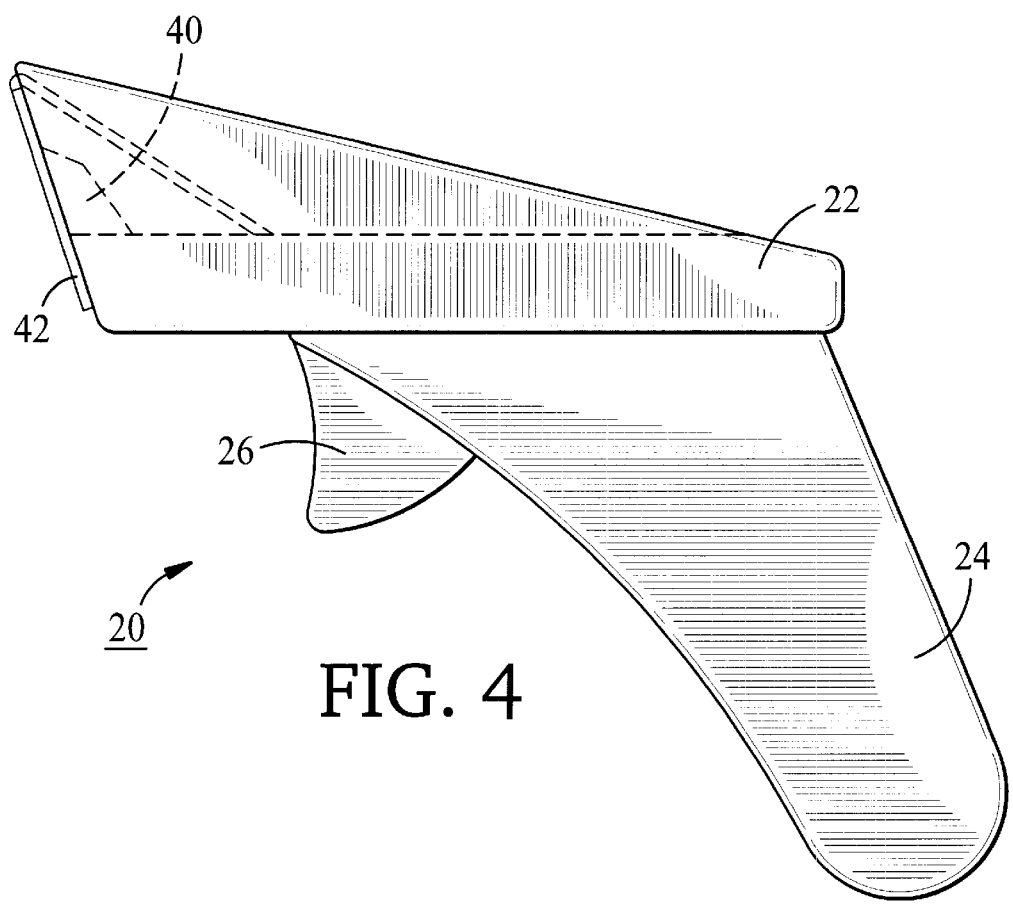
FIG. 4 is a side elevational view of the scanner.

The drawing figures illustrate an optical scanner, constructed according to the present invention, and generally indicated by the reference numeral 20. Scanner 20 includes a housing 22 having an integral handle portion 24 (FIG. 4) including a manually depressible activating switch 26 (FIG. 4). So arranged, scanner 20 may be manually gripped by handle portion 24 and activating switch 26 manually depressed to activate the scanner, the operation of which is described below.

FIG. 1 illustrates scanner 20 as including a power-communication cord 30 attached to housing 22 to furnish electrical power to the internal components of the scanner, although internal batteries (not shown) may be provided to furnish the electrical power and communication to external devices (not shown) or power may be provided by other conventional means (not shown). For this reason, power/communication cord 30 is not shown on the other figures, it being understood that the power/communication cord may or may not be provided as part of the present invention.

Figure 2:
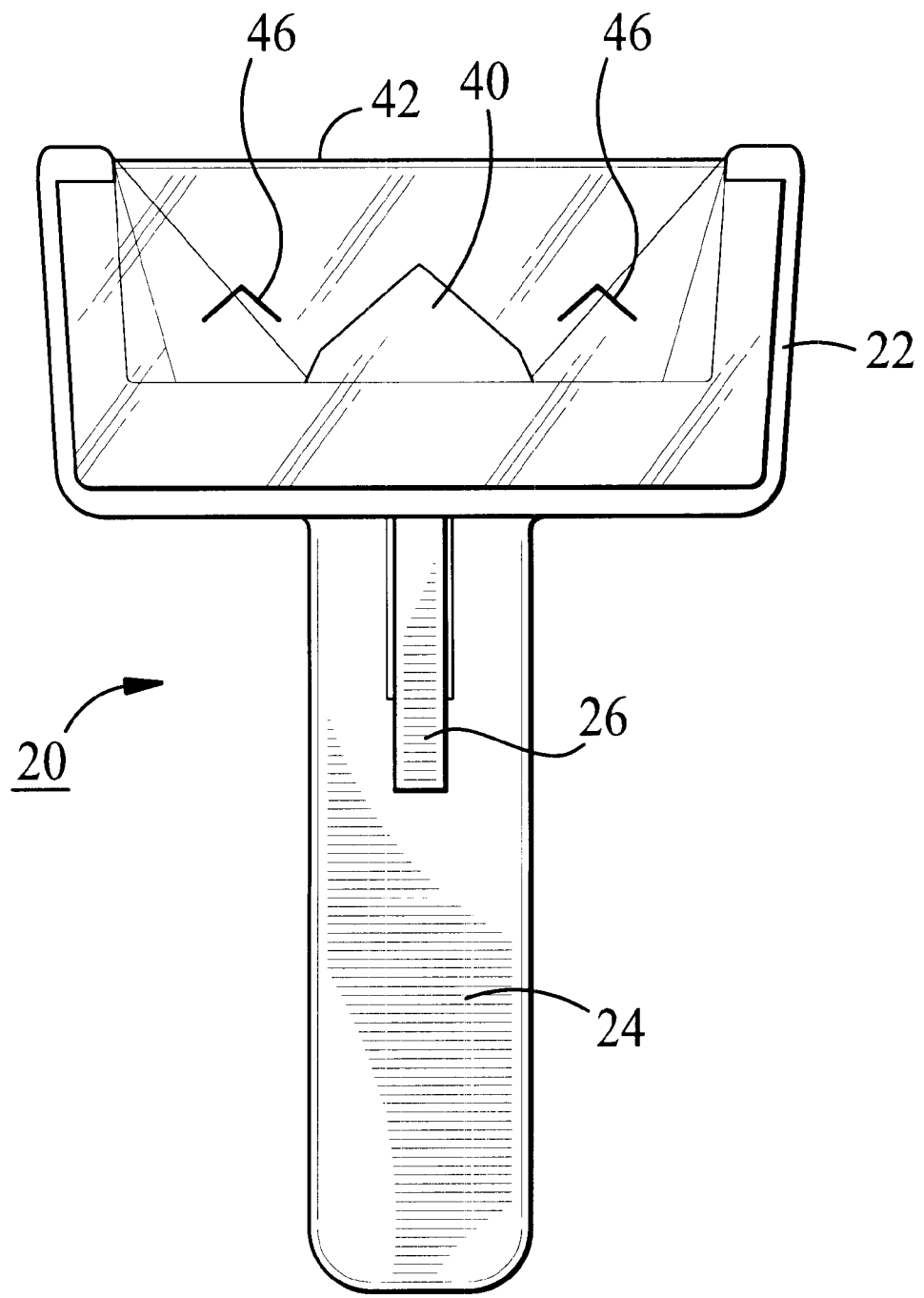
FIG. 2 is a bottom plan view of the scanner.
Figure 3:
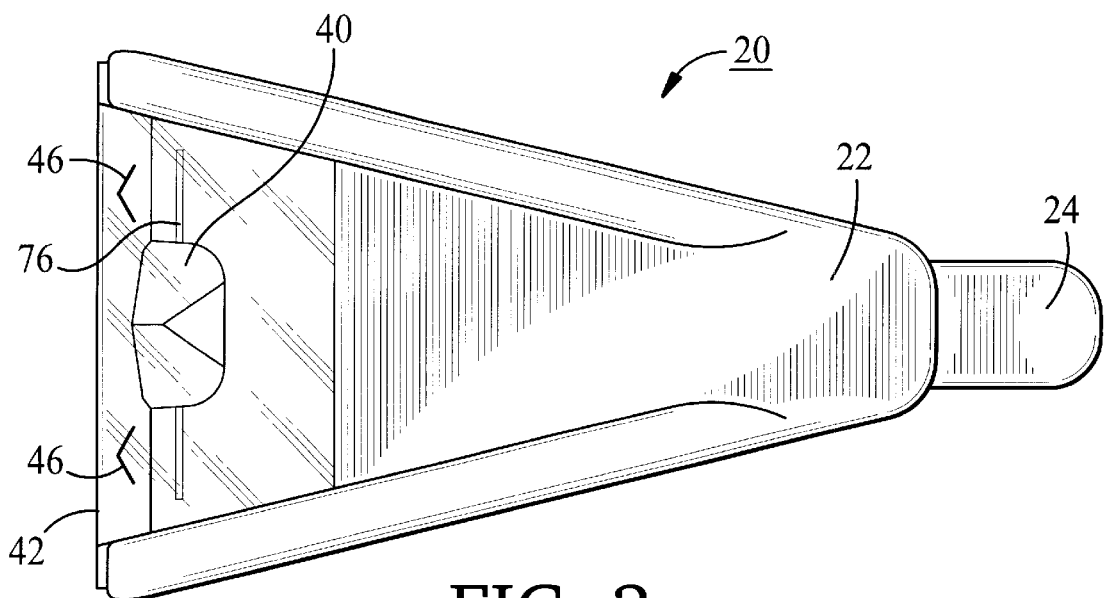
FIG. 3 is a top plan view of the scanner.

Referring to FIGS. 1–3, scanner 20 includes a light source/photodetector head 40 disposed in the front of the scanner for transverse movement back and forth in a plane across the front portion of the scanner. A transparent window 42 extends across the face of the front of scanner 20 in a plane parallel to that of the movement of the light source/photodetector head 40 and extends over the top of the space containing the light source photodetector head so as to allow visual sighting through the window by the operator of the scanner. Window 42 includes aligning marks 46 disposed on the front surface thereon, the function of which is described in detail below.

Figure 5:
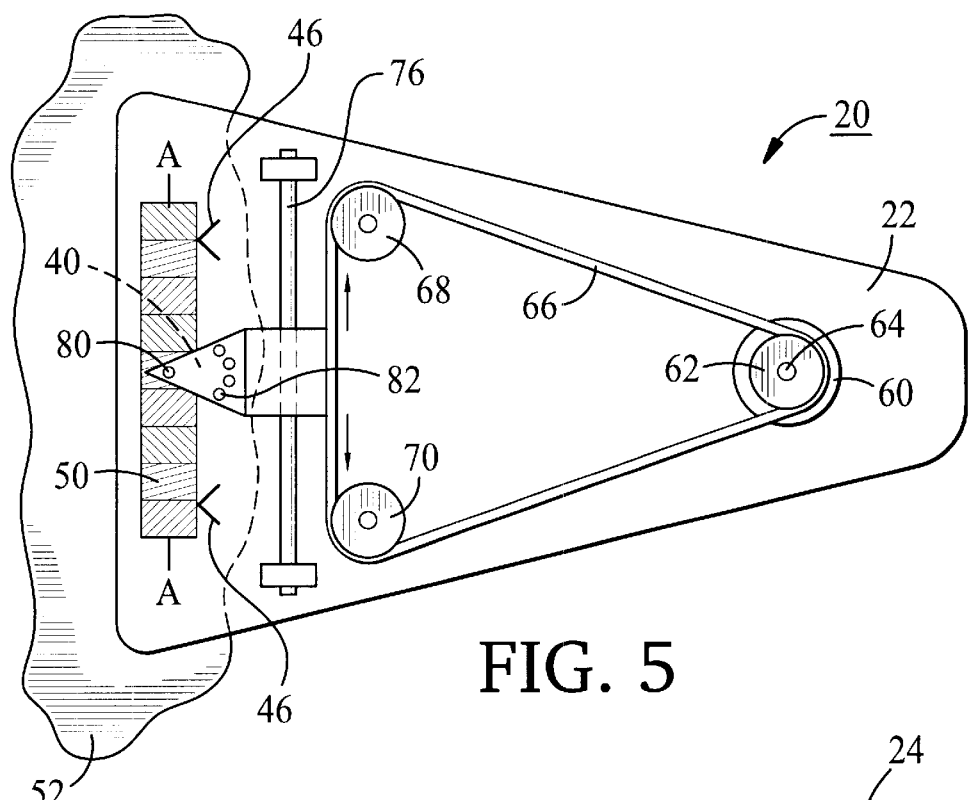
FIG. 5 is a cut-away, top plan view of the scanner scanning optical indicia.
Figure 6:
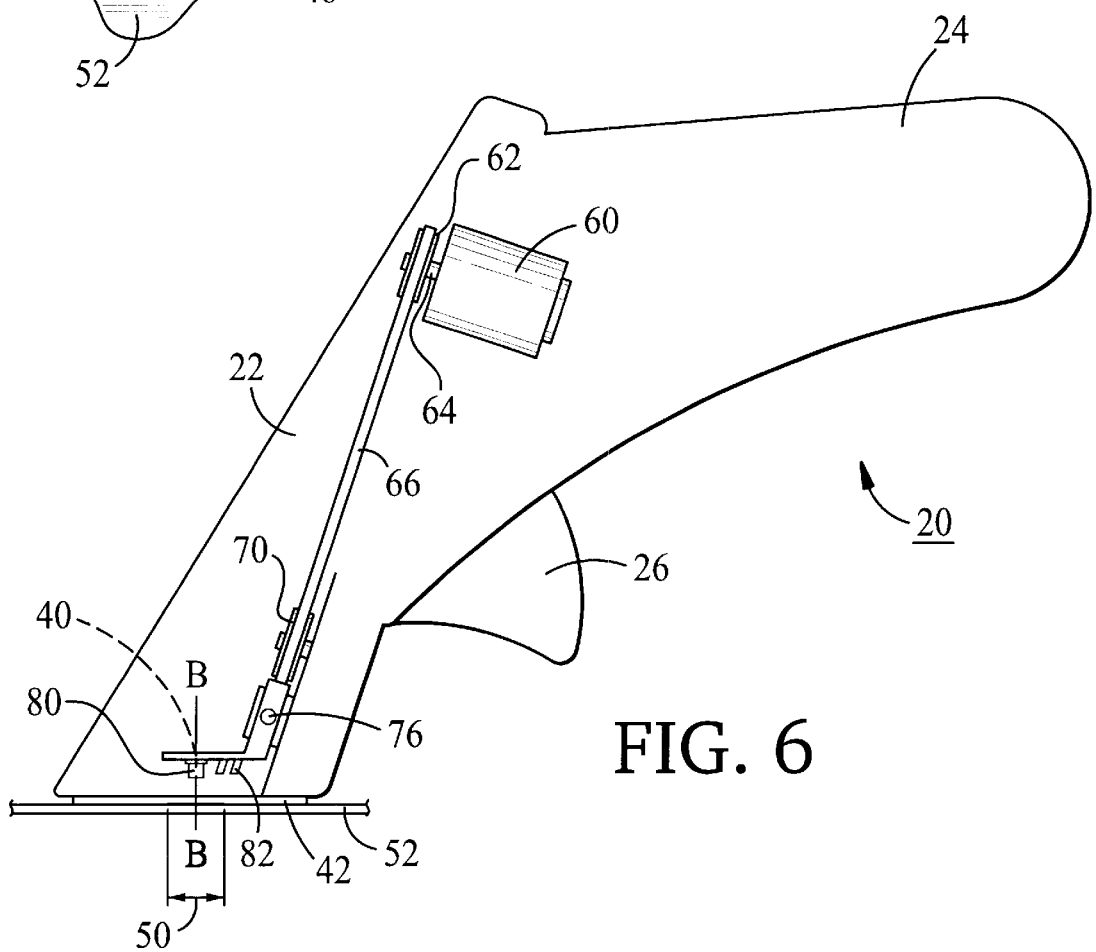
FIG. 6 is a cut-away, side elevational view of the scanner scanning optical indicia.

FIGS. 5 and 6 illustrate scanner 20 scanning optical indicia 50 disposed or printed on a substrate 52. Optical indicia 50 may be a strip of diffraction gratings as is described in U.S. Pat. No. 5,627,663, issued May 6, 1997, to James S. Bianco et al., and titled SECURE OPTICAL IDENTIFICATION METHOD AND MEANS, or the optical indicia may be a laser-etched bar code as is described in U.S. Pat. No. 5,175,420, issued Dec. 29, 1992, to James S. Bianco, and titled BAR CODE SCANNER HAVING A LIGHT SOURCE/PHOTODETECTOR MOVABLE IN A RASTER PATTERN.

Light source/photodetector 40 includes a light source 80 and four photodetectors 82. It will be understood that, when indicia 50 comprises a diffraction grating strip (FIG. 5), light source/photodetector head 40 will have a least a number of photodetectors equal to the number of different planes in which the diffraction grating strip diffracts light. In the case shown, the number would be four; however, it will be understood that more or fewer than four may be employed depending on the number of different planes. On the other hand, when optical indicia 50 comprises a laser-etched bar code, such as is used on silicon wafers, only one photodetector 82 may be employed in light source/photodetector head 40.

FIGS. 5 and 6 also illustrate the mechanism and method by which light source/photodetector 40 is caused to move transversely back and forth across the front of scanner 20. As seen on FIG. 5, aligning marks 46 are used to position scanner 20 so that at least the photodetector elements of light source/photodetector head 40 will scan along a line, "A—A" on FIG. 5, coincident with or substantially parallel to the lengthwise axis of optical indicia 50. This is particularly important when optical indicia 50 comprises a series of diffraction grating elements as described in the above-referenced '663 patent, since misalignment of the photodetector elements of light source/photodetector head 40 with respect to the optical indicia would cause skew which could cause the scanner to misread the optical indicia. As seen on FIG. 5, aligning marks 46 are aligned with an edge of optical indicia 50, here, a strip of diffraction grating elements. Also, in this case, since the diffraction grating elements diffract light in four different planes, four photodetectors 82 are provided in light source/photodetector head 40.

As seen on FIG. 6, scanner 20 is positioned with window 42 disposed against optical indicia 50 and, most preferably, against, and necessarily parallel to, substrate 52 on which the optical indicia is printed or otherwise formed. In this position, light source 80 of light source/photodetector head 40 is substantially orthogonal to the plane of the optical indicia 50, thus permitting in the field an accurate scanning of the optical indicia.

The greatest accuracy in reading optical indicia 50 occurs when light source 80 (FIG. 6) is perpendicular to the optical indicia and when the light source moves along line "A—A" (FIG. 5), that is, when marks 46 are aligned with a path parallel to the line "A—A". The degrees of perpendicularity and alignment do not have to be precise, although, as noted above, the most accurate reading of optical indicia 50 occurs when the degrees are exact. Whether an accurate reading can be made without such precision depends on a number of factors: the density of lines in optical indicia 50, the wavelength of light source 80, how pure the light source is, and the size of photodetectors 82.

Continuing to refer to FIGS. 5 and 6, the mechanism by which light source/photodetector head 40 is moved transversely across the front of scanner 20 includes a reversible electrical motor 60 having a drive pulley 62 attached to the shaft 64 of the motor. A continuous belt 66 to which light source/photodetector head 40 is attached encircles drive pulley 62 and idler pulleys 68 and 70, all the pulleys being aligned in a common plane. Light source/photodetector head 40 is journaled on a shaft 76 which is fixedly attached to housing 22 and is parallel to a line defined by the apexes of aligned marks 46.

So arranged, selective rotation of motor 60 in one direction and then in the other direction will cause light source/photodetector head 40 to move transversely back and forth in housing 22 on shaft 76 in a plane parallel to the plane of optical indicia 50 so as to scan the optical indicia when the optical indicia are aligned with aligning marks 46. Operation of the scanning mechanism is activated by the depression of activation switch 26 and conventional internal control circuitry (not shown). Decoding of optical indicia 50 is accomplished by conventional internal or external control circuitry (not shown).

Other means of moving light source/photodetector head 40 may be provided as well.

Most of the components of scanner 29 can be economically manufactured of thermoplastic materials using conventional techniques know in the art. The moving parts of scanner 20 are simple and the complicated scanning mechanisms of conventional optical indicia scanners are avoided.

Scanner 20 can be easily used in the field by employing internal batteries (not shown) or an external battery pack (not shown) to which power/communication cord 30 (FIG. 1) is attached. Whatever, the source of power, the construction of scanner 20 permits the scanner to be used in the field to read otherwise very difficult to read indicia by placing transparent window 42 (FIG. 1) against indicia 50 (FIG. 6) such that the path of light from light source 80 is perpendicular to the indicia and aligning marks 46 (FIG. 5) with a line parallel to the line of reading.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "above", "below", "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. An optical indicia scanner, comprising:
   (a) a housing;
   (b) a light source disposed in said housing;
   (c) a photodetector head disposed in said housing;
   (d) an optical indicia engaging, clear front plate disposed on said housing through which clear front plate said indicia is scanned when said optical indicia engaging, clear front plate is parallely disposed against said optical indicia; and
   (e) apparatus disposed in said housing to move said light source and said photodetector transversely back and forth in said housing so as to move said photodetector along said optical indicia to scan said optical indicia;
   wherein said apparatus comprises: an endless belt disposed in said housing to which said photodetector head is attached; a reversible motor disposed in said housing to move said endless belt; and
   a shaft on which said photodetector head is journaled disposed in said housing, said shaft being parallel to a line defined by aligning marks disposed on said indicia engaging, clear front plate.

2. An optical indicia scanner, as defined in claim 1, wherein: said light source is substantially perpendicular to a plane in which said optical indicia lie when said optical indicia engaging, clear front plate engages said optical indicia or a substrate on which said optical indicia is placed.

3. An optical indicia scanner, as defined in claim 1, further comprising: aligning marks disposed on said optical indicia engaging, clear front plate, said aligning marks being substantially alignable with a major axis of said optical indicia or substantially alignable with a line parallel to said major axis so as to permit said photodetector head to scan said optical indicia without substantial skew with respect to said optical indicia.

4. An optical scanner, as defined in claim 3, wherein: said optical indicia engaging, clear front panel is disposed such that an operator of said optical scanner can view said optical indicia and said aligning marks through said optical indicia engaging, clear front plate.

5. A method of scanning optical indicia, comprising:
   (a) providing an optical indicia scanner including: a housing; a light source disposed in said housing; a photodetector head disposed in said housing; and an optical indicia engaging, clear front plate disposed on said housing through which clear front plate said optical indicia is scanned;
   (b) causing said photodetector head to move transversely back and forth in said housing so as to move said light source and said photodetector along said optical indicia to scan said optical indicia when said indicia engaging, clear front plate is parallely disposed against said optical indicia; and
   providing as elements causing said photodetector head to move back and forth in said housing: an endless belt disposed in said housing to which said photodetector head is attached;
   a reversible motor disposed in said housing to move said endless belt; and
   a shaft on which said photodetector head is journaled disposed in said housing, said shaft being parallel to a line defined by aligning marks disposed on said indicia engaging, clear front plate.

6. A method of scanning optical indicia, as defined in claim 5 further comprising: providing said light source in said photodetector head such that a path of light from said light source is substantially perpendicular to a plane in which said optical indicia lie when said optical indicia engaging, clear front plate engages said optical indicia or a substrate on which said optical indicia is placed.

7. A method of scanning optical indicia, as defined in claim 5, further comprising: providing aligning marks disposed on said optical indicia engaging, clear front plate, said aligning marks being substantially alignable with a major axis of said optical indicia or substantially alignable with a line parallel to said major axis so as to permit said photodetector head to scan said optical indicia without substantial skew with respect to said optical indicia.

8. A method of scanning optical indicia, as defined in claim 7, further comprising: providing said optical indicia engaging, clear front panel disposed such that an operator of said optical scanner can view said optical indicia and said aligning marks through said optical indicia engaging, clear front plate.

9. An optical indicia scanner and optical indicia, comprising:
   (a) a housing;
   (b) a light source disposed in said housing;
   (c) a photodetector head disposed in said housing;
   (d) an optical indicia engaging, clear front plate disposed on said housing and disposed parallely against said optical indicia; and
   (e) said optical indicia being scanned by said photodetector head; and
   apparatus disposed in said housing to move said light source and said photodetector transversely back and forth in said housing so as to move said light source and said photodetector along said optical indicia to scan said optical indicia;
   wherein said apparatus comprises: an endless belt disposed in said housing to which said photodetector head is attached;
   a reversible motor disposed in said housing to move said endless belt; and
   a shaft on which said photodetector head is journaled disposed in said housing, said shaft being parallel to a line defined by aligning marks disposed on said indicia engaging clear front panel.

10. An optical indicia scanner and optical indicia, as defined in claim 9, wherein: a path of light from said light source in said photodetector head is substantially perpendicular to a plane in which said optical indicia lie when said optical indicia engaging, clear front plate parallely engages said optical indicia or a substrate on which said optical indicia is placed.

11. An optical indicia scanner, as defined in claim 9, further comprising: aligning marks disposed on said optical indicia engaging, clear front plate, said aligning marks being substantially alignable with a major axis of said optical indicia or substantially alignable with a line parallel to said major axis so as to permit said photodetector head to scan said optical indicia without substantial skew with respect to said optical indicia.

12. An optical scanner and optical indicia, as defined in claim 9, wherein: said optical indicia engaging, clear front panel is disposed such that an operator of said optical scanner can view said optical indicia and said aligning marks through said optical indicia engaging, clear front panel.

* * * * *